UNITED STATES PATENT OFFICE.

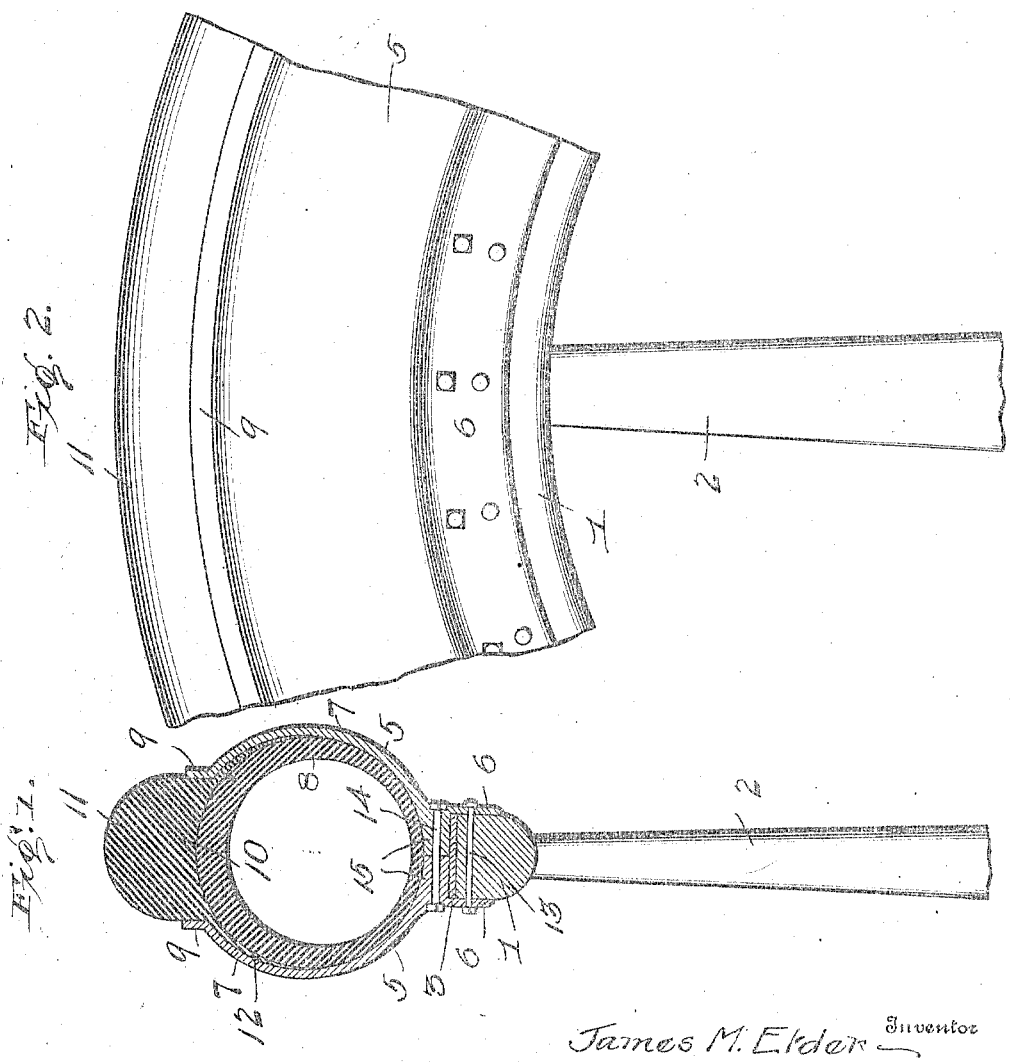

JAMES M. ELDER, OF INDIANAPOLIS, INDIANA.

PNEUMATIC TIRE.

No. 811,490.     Specification of Letters Patent.     Patented Jan. 30, 1906.

Application filed March 24, 1905. Serial No. 251,868.

*To all whom it may concern:*

Be it known that I, JAMES M. ELDER, a citizen of the United States, residing at Indianapolis, in the county of Marion and State of Indiana, have invented certain new and useful Improvements in Pneumatic Tires; and I do hereby declare the following to be a full, clear, and exact description of the invention, such as will enable others skilled in the art to which it appertains to make and use the same.

My invention relates to improvements in pneumatic tires particularly adapted for use on the wheels of automobiles and bicycles.

It has for its object, among others, to provide a simple and cheap armor for protecting the tire and securing it to the wheel, which may be easily attached to the rim of an ordinary wheel.

The invention consists in a metal casing extending well up around the sides of the pneumatic tire, which is held therein. The tread of the tire is covered by a strip of tough pliable material having lateral flanges extending within the casing, whereby it is held securely in place. Said metallic casing is secured to the rim of the wheel and because of its incasing side plates prevents the tire from being torn off when the vehicle skids. The tough covering for the tread of the wheel protects the tire from punctures.

The invention also consists in the features of construction and combinations of parts hereinafter described, and more particularly pointed out in the claims concluding this specification.

In the accompanying drawings, illustrating the preferred embodiment of my invention, Figure 1 is a broken sectional view through the rim of a wheel, single-tube tire, and armor therefor. Fig. 2 is a side view thereof.

While the preferred embodiment of my invention is fully illustrated in the accompanying drawings and its construction and operation are described in this specification, the right is reserved to make such changes from the construction shown and described herein as the scope of the claims hereto appended will permit.

In carrying out my invention I provide side pieces of suitable metal, preferably a kind which will not rust, said side pieces having perforated flanges, whereby they are secured to opposite sides of the fellies or rim of the wheel. Said side pieces are preferably curved in cross-section to conform to the surface of the tire, and they extend well around said tire, just leaving a space between them at the tread of the tire preferably less than the diameter of the tire. A preferably solid bearing-strip, of leather, rubber, rawhide, or a combination of canvas and any or all of the other materials or any other suitable material is arranged over the tread of the tire and has flanges extending within the metal side pieces, whereby it is held in place. Said flanges are preferably thin and tapering to their edges and of sufficient width to give a good bearing within the edges of the side pieces. The central portion of the bearing-strip is very thick and projects some distance from the flanged edges of the side pieces. The side pieces extend between the pneumatic tire and the ordinary flat metal tire on the wheel. Two rows or sets of bolts are used, one set passing through the felly and securing the side pieces to the wheel and the other row or set connecting the two side pieces outside the wheel-rim and clamping said side pieces around the tire, whereby it and the bearing-strip are held firmly in place.

Referring more particularly to the drawings, 1 is the felly, 2 the spokes, and 3, Fig. 1, the metal tire of the ordinary wheel. The side pieces 5 are provided with inner flanges 6 to engage the sides of the fellies, curved portions 7 extending around the sides of the pneumatic tire 8 and outer flanges 9 adapted to lie close to the sides of the thick projecting portion 10 of the bearing-piece 11. The thin tapering flanges of the bearing-strip are designated 12. The bolts 13 pass through the inner flanges 6 of the side pieces and the felly. The other set of bolts 14 pass through the portions 15 of the side pieces arranged between the metal tire and the pneumatic tire.

My armor may be used on any form of single or double tube tire. The bearing-strip should be made slightly smaller in circumference on its inner surface than the outer surface of the pneumatic tire, so that when the latter is fully inflated it will make the bearing-strip fit snugly within the side pieces, so that it will not creep. The side pieces or casings may be made of brass, phosphor-bronze, or malleable iron or cast-steel galvanized or plated with tin, so that it will not rust. Said casings may also be made of sheet-steel stamped to the proper shape and enameled inside. When used on heavy cars, the outer surfaces of said side pieces or casings may be reinforced by ribs to strengthen them. It will be noted that although the pneumatic tire is so well protected, if it should become punctured or burst the side pieces, tire, and bearing-strip may all be taken off in the preferred construction and the vehicle may be brought home on the metal tires.

Having thus described my invention, what I claim as new, and desire to secure by Letters Patent, is—

1. The combination with a wheel-rim, of a pneumatic tire, side pieces adapted to extend around the sides of said tire and to conform thereto, said side pieces having flanges adapted to engage the sides of said wheel-rim and portions adapted to extend between said rim and tire, a bearing-strip arranged between said side pieces over the tread of the tire, means to secure said bearing-strip in place, means to secure said side pieces to the wheel-rim, and means to clamp said side pieces to each other between the tire and the rim.

2. The combination with a wheel-rim, of a metal tire thereon, a pneumatic tire, side pieces adapted to extend round the sides of said pneumatic tire and to conform thereto, said side pieces having flanges adapted to engage the sides of said wheel-rim and portions adapted to extend between said rim and tire, a bearing-strip arranged between said side pieces over the tread of the pneumatic tire, means to secure said bearing-strip in place, means to secure said side pieces to the wheel-rim, and means to clamp said side pieces to each other between the pneumatic tire and the metal tire.

In testimony whereof I affix my signature in presence of two witnesses.

JAMES M. ELDER.

Witnesses:
 ARTHUR F. SHAFER,
 JOSEPH W. HUTCHINSON.